March 22, 1949. H. N. SHEPPARD Re. 23,094

CIRCULAR KNIT HOSIERY AND METHOD OF MAKING SAME

Filed June 13, 1946 3 Sheets-Sheet 1

Inventor
HARRY N. SHEPPARD
by his attorneys
Howson and Howson

CIRCULAR KNIT HOSIERY AND METHOD OF MAKING SAME

Filed June 13, 1946 3 Sheets-Sheet 2

Inventor
HARRY N. SHEPPARD
by his attorneys
Howson and Howson

CIRCULAR KNIT HOSIERY AND METHOD OF MAKING SAME

Filed June 13, 1946 3 Sheets-Sheet 3

Inventor
HARRY N. SHEPPARD
by his attorneys
Howson and Howson

Reissued Mar. 22, 1949

Re. 23,094

UNITED STATES PATENT OFFICE 23,094

CIRCULAR KNIT HOSIERY AND METHOD OF MAKING SAME

Harry N. Sheppard, Maplewood, N. J., assignor to Scott & Williams, Incorporated, Laconia, N. H., a corporation of Massachusetts Original No. 2,431,204, dated November 18, 1947, Serial No. 676,526, June 13, 1946. Application for reissue November 18, 1948, Serial No. 60,696

15 Claims. (Cl. 66—187)

This invention relates to circular knit hosiery and method of making same, and more particularly to the structure of the heel. The stocking is adapted to be made on circular knitting machines having independent needles and in which there is relative rotary and reciprocatory movement of the needles and knitting cams. The stocking may be one with a low heel, as shown, for example, in the reissue patent to Robert W. Scott No. 16,795, dated November 22, 1927, and more specifically is an improvement on the patent for "Circular knit hosiery and method of making same," granted to Harry N. Sheppard on November 6, 1945, No. 2,388,649.

The object of the invention is to strengthen the heel of the stocking at the inner ends of the gussets, and more particularly at the inner ends of the suture lines joining the gussets. As shown in the above-mentioned Sheppard patent, the heel here in question comprises a plurality of adjacent tapered gussets arranged one below the other, each extending to the strengthening courses referred to below, i. e., contiguous to the instep fabric. Each course in the gussets contains less than half the wales in the leg of the stocking. One of the intermediate gussets extends further into the instep than the gusset above it, whereby the inner ends of the sutures on each side of this intermediate gusset are separated. It is characteristic of the invention that two or more strengthening courses are provided around the top of the heel, extending shortly beyond the end of the lowest of the gussets on each side, thereby strengthening the fabric between the two separated inner ends of the suture lines above-mentioned.

In the drawings:

Figure 3 is an enlarged diagrammatic view of the interlacing of the stitches along one side of the upper edge of the heel of the stocking of Figs. 1 and 2, the number of stitches in the various parts of the heel being much less than in an actual stocking; while

When making fine-gauge stockings in accordance with the above-mentioned Sheppard patent, where very fine denier yarns are used in the instep of the stocking, it sometimes happens that the stocking breaks at the heel at the point 18 opposite the instep on the suture line between the first and second narrowed gussets. While the separation of the inner ends of the sutures on each side of the intermediate gusset 11 serves to distribute the strain normally found at the inner end of the single suture of a plain circular knit heel, I have found a way in which the sutures of the heel thus can be concatenated so as to provide the maximum strength at the points where needed.

Figure 2:
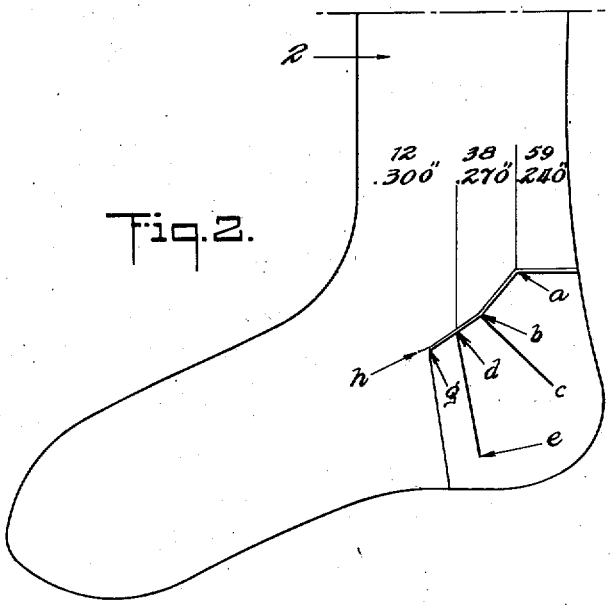
Figure 2 is a somewhat similar diagrammatic view of a specific stocking similar to Fig. 1, omitting the lines which diagrammatically represent the wales of the stocking but showing the numerical relations of the various suture lines and needles used to make them in one embodiment of the stocking.

It will be seen that the heel shown in Fig. 2 of the said Sheppard patent involves the use of heavy yarns in the knitting of the heel and light yarns in the knitting of the instep side of the stocking. It will also be seen that along the upper edge of this heel where the transition from the heavy to the light yarn occurs, there is no line of stitches formed from a continuous yarn uniting the inner ends of the two sutures; nor is there any line of stitches formed from a continuous heavy yarn extending beyond all the sutures to distribute the strain ordinarily found at the ends of sutures. In accordance with my invention there are provided say two courses of stitches knit in integral succession extending around the entire heel side of the stocking and slightly beyond the last suture on each side. These stitches being knit reciprocatorily, are not only each formed of a continuous heavy thread but the thread doubles back on itself at the inner ends of the sutures, as can be seen, for example, in Fig. 3. I have found by careful test that protective courses thus located and interknit with the sutures and upper ends of the gussets serve to unite the inner ends of the sutures and distribute the strains at the ends of the sutures in a most desirable manner.

The heel shown in Fig. 1 will be described as if containing four tapered gussets. It will be described as if the stocking were being knit from top to toe. Reading from the top down—which is the order in which they are knit—the top gusset is a widened gusset 21 which serves as a tapered high splice for the heel. Next comes the first of the narrowed gussets which is identified by the reference numeral 8; then the second narrowed or intermediate gusset 11; and a final widened gusset 19. Prior to the knitting of the first widened gusset, my two reinforcing courses 3 and 4 are knit extending from the point 16 to the point 17 down to the point 18 and further along each side of the stocking to a point beyond where the last or bottom widened gusset is located. This final gusset is adjacent the sole of the stocking. The tapered high splice widened gusset 21, like all the other gussets in the heel, is knit reciprocatorily beginning on the needles extending from point 16 at the back of the stocking to point 17 on each side where the taper is to begin. The whole gusset is knit by reciprocatory knitting, widening as the knitting progresses from point 17 to point 18 along the inner end of the gusset. This point 18 is at the inner end of the first narrowed segment. Thus it will be seen that as far as concerns the widened gusset 21, the suture which is formed between points 17 and 18 in knitting this gusset reciprocatorily, is knit directly to the second or lower of the through protective courses, namely, the course 4.

After the widened gusset 21 has been finished, the first narrowed gusset 8 is knit, followed by the second narrowed gusset 11. The longest course in the widened gusset 21 contains a lesser number of wales than half of the number of wales in the leg 2 of the stocking, and the first narrowed gusset 8 begins its knitting on the maximum number of needles used in the widened gusset 21. When the reciprocatory knitting, with gradually decreasing number of needles in the active segment, has completed the suture 12 and interknit stitches with the strengthening course 4, it becomes time to start formation of the second narrowed gusset 11. As described in the said Sheppard patent, there are more wales in this second gusset 11 than in the first narrowed gusset 8, and there are also more courses in gusset 11. To bring this about, the knitting of the second gusset is varied from that of the first narrowed gusset 8 as follows.

In knitting the first course of the second narrowed gusset 11, the stitches are knit along the entire length of the suture 12 and the additional stitches extending across the gap 9 between the point 18 of suture 12 and the inner end of suture 15 on the foot side of the segment 11. These stitches across the gap are united directly to the stitches of the continuous protective course 4. When the reciprocatory knitting of the gusset 11 reaches the course corresponding to the lower end of the suture 12 between gussets 11 and 8, the reciprocatory knitting proceeds further by means of extra courses which cause extra narrowing and the gusset 11 therefore has both more wales and more courses than the narrowed gusset 8. The advantages of this gusset are set forth in the above-mentioned Sheppard patent, but it may be noted that there is no suture joining the inner ends of the sutures 12 and 15 and that the strain at that point in my improved stocking is taken largely by the continuous protective courses 3 and 4.

Figure 1:
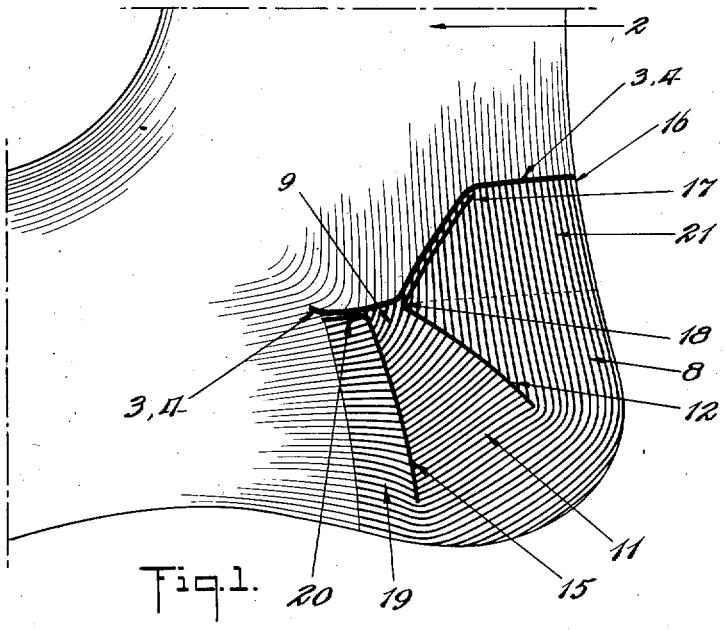
Figure 1 is a diagrammatic view of one side of the foot of a stocking made in accordance with this invention, the heavy line around the top of the heel representing the protective courses, and the other heavy lines in the heel representing the suture lines.

Thereafter a final gusset 19 is knit in much the same manner as the third gusset of Fig. 1 of the said Sheppard patent, with widening at the inner ends of the active segments of the needles to give a suture 20 whose direction is a direct continuation of a line extending from the point 18 to the suture 15. This suture 20, of course, is directly knit to the second continuous protective course 4. As shown in Fig. 1, the protective courses 3 and 4 extend beyond the end of the suture 20 towards the foot, a matter of a few stitches. This extension prevents formation of objectionable eyelets.

Figure 3:
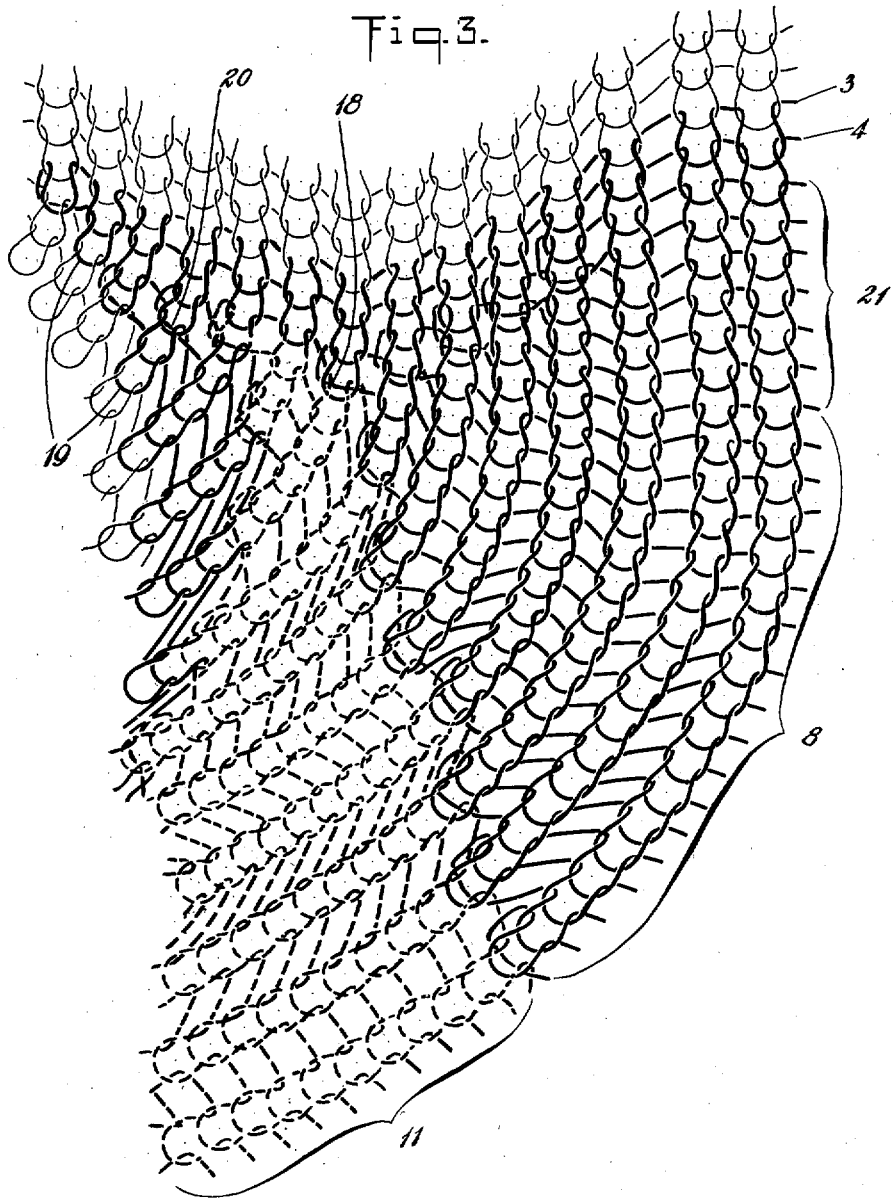

Turning now to Fig. 3 of the drawings, in order that the strengthening effect of my novel courses may be clearer, it will be seen that the leg fabric 2 is knit of light yarn and my new continuous protective courses are knit of heavy yarn, as is the case with all the other yarns in the heel proper. The yarns used to knit the widened gusset 21 and the first narrowed gusset 8 are shown in heavy, solid lines, while the stitches forming the second narrowed gusset 11 are shown in dash lines. The few courses of the widened gusset 19 which are shown are in solid, heavy lines, and the light yarns used in the foot are shown by means of a few light stitches connected to this widened gusset 19. As already mentioned, the number of stitches in Fig. 3 is very much reduced, for the sake of clarity, from those which actually exist in the stocking, but it can be seen that my continuous protective courses carry across from the first narrowed gusset 8 to the widened gusset 19 and extend beyond that widened gusset a couple of stitches in the diagrammatic view of this figure, so that strains are distributed properly and the two suture lines are interconnected or concatenated so as to help each other take up the strain, by means of heavy yarns which protect them from a concentration of strain at one point.

The manner of manipulation of the needles of a circular knitting machine to produce such a heel will next be described in connection with Fig. 2 of the drawings and the patent to Albert E. Page No. 1,841,205, dated January 12, 1932, referred to in the Sheppard Patent 2,388,649, above mentioned. Assume that the stocking is being knit from top to toe and that the machine is all set for the necessary yarn changes going into the heel. The main rack on the pattern drum going into the heel first takes place, and the usual raising cam raises out of action all needles on the half of the cylinder corresponding to the instep of the stocking. These needles are ones with the two longest lengths of butts, namely, the .338 inch butt needles and the .390 inch butt needles. As can be seen by reference to Fig. 4, the .338 needles are divided into a central group and a lateral group beyond each .390 group. On the same rack of the main pattern drum an auxiliary butt jack raising cam (not shown) moves into action against the long butt jacks which are located under fourteen .300 butt needles located adjacent the end group of .338 needles on the left side of the cylinder and the long butt jacks which are located under twelve .300 butt needles located adjacent the end group of .338 needles on the right side of the cylinder. The twelve and fourteen .300 butt needles are raised by the long butt auxiliary jack far enough so that as the cylinder continues to turn they contact and are raised further by an auxiliary needle raising cam (not shown) which lifts them to the inactive level alongside the needles raised by the usual raising cam. The needles thus raised by the two means together are marked "Group 1" in Fig. 4.

It will be observed that the only needles now left in action are those from point *h* on one side where the novel reinforcing courses end, to the similar point on the other side going around the back of the stocking. It will also be noted that by means of jack selection it has been possible to start the protective courses in the middle of the group of .300 butt needles. These courses are knit beginning with the first reciprocation of the needle cylinder. On the first reverse reciprocation of the needle cylinder, the left picker pick raises one .300 butt needle out of action, and the remainder of the needles which are active, namely, those on the heel side minus the twelve and fourteen .300 butt needles in Group 1, knit the first protective course 3. On the first forward movement of the needle cylinder, the right lifter pick raises one .300 butt needle and the protective course 4 is knit on the remaining needles.

The machine now prepares to make the widened gusset 21. It is first necessary to raise out of action all the remaining needles except those from point 16 to point 17 on each side. Thus the needles to be put out of action at this time constitute the two sets marked "Group 2," namely, the balance of the .300 butt needles and the .270 butt needles. These needles lie between points *a* and *h*, as marked in Fig. 4. The raising of the needles of the left Group 2 as viewed in this figure is initiated by short butt auxiliary jacks, and completed by an auxiliary needle raising cam. The needles of Group 2 on the right of the figure are raised by the left gusset raising cam (not shown). This raises all the needles comprising Group 2. The left gusset raising cam and the auxiliary butt pattern jack and needle raising cams are withdrawn at the end of a forward stroke by a short rack of the main pattern drum.

On this short rack of the main pattern drum, the main raising switch is moved in to a position where it just misses the .270 butt needles, but is in position to engage the .300 butt needles. The cylinder is still reciprocating and the widened gusset 21 is now made. At each oscillation one of the lifter picks lifts one .240 butt needle on each side out of action before the dropper begins to pick down. The net effect of the lifter pick and the dropper pick is to increase the number of active needles, and thus picking continues until only eighteen .270 butt needles of the last .270 group remain inactive, and seventeen .270 butt needles of the first .270 group remain inactive. (The actual numbers referred to in this example are those shown in Figs. 2 and 4, but it should be understood, of course, that the numbers can be varied as desired.) When the picking has reached this point, the knitting of the widened high splice gusset 21 has been completed and the dropper is then retired out of action. The knitting has now reached point *b*. To make the first narrowed gusset 8, the lifters pick up needles until all the .270 butt needles and eight .240 butt needles are lifted on the left-hand side of the cylinder, and all the .270 butt needles and seven of the .240 butt needles are lifted on the right-hand side of the cylinder. The knitting has then reached the point *c* on the suture 12 between the first and second narrowed gussets. In order to prepare to knit the first course of the gusset 11, which course extends from the point *d* to the point *b* to the point *c*, all the needles on the short butt side are switched down and all but the .270 and .240 butt needles are raised again.

The knitting of the second tapered gusset 11 then begins and the lifter pick gradually picks up all the .270 butt needles and twelve .240 butt needles on the left side, and all the .270 and eleven .240 butt needles on the right side. The knitting has now reached point *e*, thus completing gusset 11.

To prepare for the knitting of the last widened gusset 19, all the needles are then switched down and all except the .270 and .240 butt needles are raised again, as was done just before beginning the narrowed segment 11. The gusset 19 is made by widening to form the suture 20. To do this, eight .300 butt needles on the left side and nine .300 butt needles on the right side of the cylinder are picked down into action. This brings the active needles to the point *g* and the machine then racks off the heel. By looking at Fig. 4 it will be seen that the point *g*, which is the point of greatest extent of the suture 20 of the last widened gusset 19, is say two needles short of the point *h* where the protective courses 3 and 4 terminate. As a result, their strengthening construction extends beyond the end of the suture and avoids formation of holes at that point. It will be observed that the light leg fabric is separated from the suture lines and their ends, as well as tying together the separated ends of the two main sutures 12 and 15.

Figure 4:
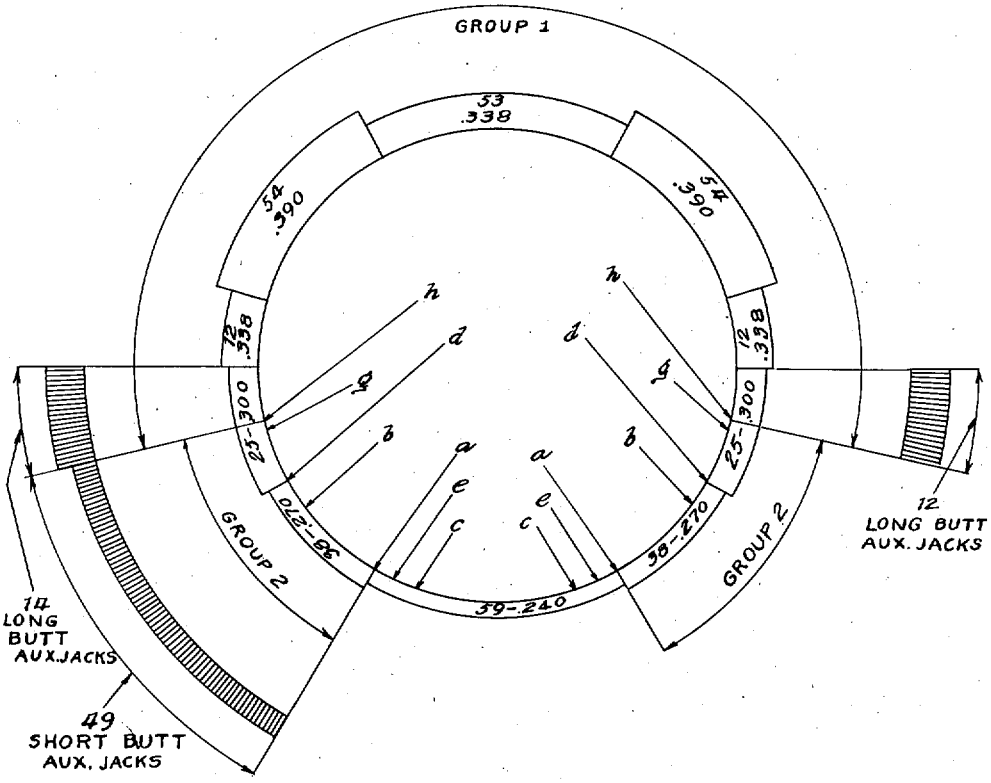
Figure 4 is a diagrammatic layout of the butts of the needles and jacks used in making the stocking heel indicated in Fig. 2.

It will be seen that the formation of the inner ends of the gusset takes place entirely on the needles which in Fig. 4 are marked "Group 2," and that Group 1, which is not involved in the heel, constitutes more than half the needles in the machine. It will be observed that with the distribution of the sutures and these strengthening courses in a small heel, a radial distribution and concatenation of the stresses is obtained which give a distribution of strain that is more efficient than in the ordinary stocking. At the same time, of course, the stocking is one which is suitable for wear with a low slipper-type of shoe.

I claim:

1. In a circular knit stocking, a heel in which there is present a plurality of tapered gussets arranged one below the other, each contiguous to the instep fabric, one of said gussets containing more wales in a plurality of courses than the longest course of a tapered gusset above it, whereby there is continuity of plain fabric from the instep of the stocking into the lower gusset, in combination with a plurality of strengthening partial courses in the heel lying entirely between the last circular knit course of the leg and the rest of the heel, one such course being interknit to the inner ends of all the tapered gussets in the heel.

2. In a circular knit stocking having a heel containing less than half the wales of the leg, a plurality of tapered gussets arranged one below the other, each contiguous to the instep fabric, one of said gussets containing more wales in a plurality of courses than the longest course of a tapered gusset above it, whereby there is a continuity of plain fabric from the instep of stocking into the lower gusset, in combination with a plurality of strengthening partial courses in the heel lying entirely between the last circular knit course of the leg and the rest of the heel, one such course being interknit to the inner ends of all the tapered gussets in the heel and extending beyond the gussets into the instep fabric a short distance.

3. In a circular knit stocking, a heel in which there is present a plurality of tapered gussets arranged one below the other, each contiguous to the instep fabric, two of such gussets being progressively narrowed and having a suture along the sole side of each gusset, the lower of said two narrowed gussets containing more wales in a plurality of courses than any course in the upper narrowed gusset, whereby there is no suture joining the inner ends of the two sutures on the sole sides of said two gussets, in combination with courses of continuous heavy yarn extending around the heel side of the stocking in contact with the inner ends of said two sutures and between the last circular knit course of the leg and all the said gussets, thereby strengthening the stocking across the plain fabric between the two sutures.

4. In a circular knit stocking having a heel containing less than half the wales of the leg, a plurality of tapered gussets arranged one below the other, two of such gussets being progressively narrowed and having a suture along the sole side of each gusset, the lower of said two narrowed gussets containing more wales in a plurality of courses than any course in the upper narrowed gusset, whereby there is no suture joining the inner ends of the two sutures on the sole sides of said two gussets, in combination with courses of continuous heavy yarn extending around the heel side of the stocking in contact with the inner ends of said two sutures and between the last circular knit course of the leg and all the said gussets and extending beyond the gussets into the instep for a short distance.

5. In a circular knit stocking, a heel in which there is present a plurality of tapered gussets arranged one below the other, each contiguous to the instep fabric, two of said gussets having sutures facing the instep fabric, there being a gusset between said two gussets having plain fabric extending into the instep between said sutures, in combination with a plurality of partial courses of continuous thread heavier than the leg yarn extending around the upper edge of the heel joining together the sutures of the gussets which face the instep fabric.

6. In a circular knit stocking having a heel containing less than half the wales of the leg, a plurality of tapered gussets arranged one below the other, each contiguous to the instep fabric, two of said gussets having sutures facing the instep fabric, there being a gusset between said two gussets having plain fabric extending into the instep between said sutures, in combination with a plurality of partial courses of continuous thread heavier than the leg yarn extending around the upper edge of the heel joining together the sutures of the adjacent gussets which face the instep fabric and extending beyond the gussets into the instep for a short distance.

7. In a circular knit stocking having a leg knit of one yarn and a heel knit of a heavier yarn, two progressively narrowed gussets arranged one below the other in the heel, said gussets each having less than half the wales in the leg, and the lower gusset containing more wales in one or more courses adjacent the upper gusset than the longest course in said upper gusset, whereby the inner ends of the suture lines between the two gussets and between the lower gusset and the fabric adjacent it on the toe side are separated, in combination with a plurality of partial courses of continuous yarn heavier than the leg yarn extending around the upper edge of the heel and joining the inner ends of the two sutures, one of said courses being connected throughout its length to the last circular knit course.

8. In a method of making circular knit hosiery, the steps of knitting a leg and then knitting a heel by reciprocatory knitting by the steps of knitting two or more partial courses of yarn heavier than the leg yarn around the heel side of the stocking connected to the last circular knit course of the leg, and immediately thereafter knitting a plurality of tapered gussets and interknitting each with the last heavy yarn course referred to, the inner ends of two sutures of such gussets being spaced from each other and the heavier yarn courses stretching between such inner ends.

9. In a method of making circular knit hosiery from top to toe, the steps of making a heel on less than half the needles of the leg, comprising knitting a plurality of partial courses around the heel side of the stocking, knitting a gusset which is interknit with the last such partial course by a progressively widened portion, subsequently knitting a narrowed gusset to an adjacent part of that course by stitches which leave plain fabric from the instep into the heel and thereafter knitting a gusset to the next adjacent part of that course by a progressively tapered portion.

10. In a method of making circular knit hosiery from top to toe, the steps of making a heel comprising knitting a plurality of partial courses around the heel side of the stocking, knitting a widened gusset which is interknit with the last such partial course by a suture, subsequently knitting a narrowed gusset to the adjacent part of that course by wales in direct continuation of wales in the partial courses and thereafter knitting a gusset to the next adjacent part of that course by a suture.

11. In a method of making circular knit hosiery from top to toe, the steps of making a heel on less than half the needles of the leg, comprising knitting a plurality of partial courses around the heel side of the stocking, knitting a widened gusset which is interknit with the last such partial course by a suture, subsequently knitting a narrowed gusset to the adjacent part of that course by wales in direct continuation of wales in the partial courses and thereafter knitting a gusset to the next adjacent part of that course by a suture, the suture of said last-mentioned gusset terminating a few stitches short of the ends of the partial courses.

12. In a method of making circular knit hosiery from top to toe, the steps of making a heel comprising knitting a plurality of partial courses around the heel side of the stocking, knitting a gusset which is interknit with the last such partial course by a suture, knitting two progressively narrowed gussets in succession with a suture between them touching the last partial course, the second such gusset being knit with a few extra wales on each end of the group, which extra wales are in direct continuation of wales in the partial courses, and thereafter knitting a progressively tapered gusset with a suture between it and the second narrowed gusset whose end touches the last partial course, and said last tapered gusset having a suture formed between it and the last partial course.

13. In a method of making circular knit hosiery from top to toe, the steps of making a heel on less than half the needles of the leg, comprising knitting a plurality of partial courses around the heel side of the stocking, knitting a gusset which is interknit with the last such partial course by a suture, knitting two progressively narrowed gussets in succession with a suture between them touching the last partial course, the second such gusset being knit with a few extra wales on each end of the group, which extra wales are in direct continuation of wales in the partial courses, and thereafter knitting a progressively tapered gusset with a suture between it and the second narrowed gusset whose end touches the last partial course, and said last tapered gusset having a suture formed between it and the last partial course, the suture of said last-mentioned gusset terminating a few stitches short of the ends of the partial courses.

14. In a circular knit stocking, a heel in which there is present a plurality of tapered gussets arranged one below the other, each contiguous to the instep fabric, one of said gussets containing more wales in a plurality of courses than the longest course of a tapered gusset above it, whereby there is continuity of plain fabric from the instep of the stocking into the lower gusset, in combination with a plurality of reinforcing partial courses in the heel lying entirely between the leg and the heel, one such course directly connecting the last circular knit course to the inner ends of the junctures of the heel gussets and to the wales of the gussets on both sides of said junctures.

15. In a circular knit stocking, a heel in which there is present a plurality of tapered gussets arranged one below the other, each contiguous to the instep fabric, two of such gussets being progressively narrowed and having a suture along the sole side of each gusset, the lower of said two narrowed gussets containing more wales in a plurality of courses than any course in the upper narrowed gusset, whereby there is no suture joining the inner ends of the two sutures on the sole sides of said two gussets, in combination with partial courses of continuous heavy yarn lying entirely between the circular knit courses of the leg and the heel and in contact with the inner ends of said two sutures and a plurality of wales of the gussets on both sides of said sutures, thereby strengthening the heel.

HARRY N. SHEPPARD.

REFERENCES CITED

The following references are of record in the file of this patent:

UNITED STATES PATENTS

| Number | Name | Date |
|---|---|---|
| 450,655 | White | Apr. 21, 1891 |
| 453,512 | Shaw | June 2, 1891 |
| 1,798,804 | Parker | Mar. 31, 1931 |
| 2,170,076 | Houseman | Aug. 22, 1939 |
| 2,388,649 | Sheppard | Nov. 6, 1945 |